(12) United States Patent
Gupta et al.

(10) Patent No.: US 9,619,699 B2
(45) Date of Patent: Apr. 11, 2017

(54) SYSTEM AND METHOD FOR ENHANCING HUMAN COUNTING BY FUSING RESULTS OF HUMAN DETECTION MODALITIES

(71) Applicant: TATA CONSULTANCY SERVICES LIMITED, Mumbai, Maharashtra (IN)

(72) Inventors: Rohit Gupta, Kolkata (IN); Aniruddha Sinha, Kolkata (IN); Arpan Pal, Kolkata (IN); Aritra Chakravorty, Hooghly (IN)

(73) Assignee: Tata Consultancy Services Limited (IN)

( * ) Notice: Subject to any disclaimer, the term of this patent is extended or adjusted under 35 U.S.C. 154(b) by 252 days.

(21) Appl. No.: 14/357,272

(22) PCT Filed: Nov. 7, 2012

(86) PCT No.: PCT/IN2012/000733
§ 371 (c)(1),
(2) Date: May 9, 2014

(87) PCT Pub. No.: WO2013/105108
PCT Pub. Date: Jul. 18, 2013

(65) Prior Publication Data
US 2014/0369561 A1    Dec. 18, 2014

(30) Foreign Application Priority Data

Nov. 9, 2011  (IN) .......................... 3167/MUM/2011

(51) Int. Cl.
*G06K 9/00*   (2006.01)
*G06T 7/20*   (2017.01)

(52) U.S. Cl.
CPC ..... *G06K 9/00362* (2013.01); *G06K 9/00778* (2013.01); *G06T 7/20* (2013.01);
(Continued)

(58) Field of Classification Search
None
See application file for complete search history.

(56) References Cited

U.S. PATENT DOCUMENTS 6,499,025 B1   12/2002   Horvitz et al.
2003/0108220 A1   6/2003   Jepson et al.
(Continued)

OTHER PUBLICATIONS

Min Li, Zhaoxiang Zhang, Kaiqi Huang and Tieniu Tan, "Estimating the Number of People in Crowded Scenes by MID Based Foreground Segmentation and Head-shoulder Detection", National Laboratory of Pattern Recognition, Institute of Automation, Chinese Academy of Sciences: 19th International Conference IEEE (4 pages), 2008.
(Continued)

*Primary Examiner* — Sean Conner
(74) *Attorney, Agent, or Firm* — Finnegan, Henderson, Farabow, Garrett & Dunner, L.L.P.

(57) ABSTRACT

The present invention discloses a method and a system for enhancing accuracy of human counting in at least one frame of a captured image in a real-time in a predefined area. The present invention detects human in one or more frames by using at least one human detection modality for obtaining the characteristic result of the captured image. The invention further calculates an activity probability associated with each human detection modality. The characteristic results and the activity probability are selectively integrated by using a fusion technique for enhancing the accuracy of the human count and for selecting the most accurate human detection modality. The human is then performed based on the selection of the most accurate human detection modality.

11 Claims, 6 Drawing Sheets

(52) U.S. Cl.
CPC .. *G06T 7/2053* (2013.01); *G06T 2207/10016* (2013.01); *G06T 2207/20224* (2013.01); *G06T 2207/30196* (2013.01); *G06T 2207/30232* (2013.01)

(56) References Cited

U.S. PATENT DOCUMENTS

2004/0190760 A1* 9/2004 Liu ................... G06K 9/00241
                                                                  382/118
2010/0290700 A1* 11/2010 Yokono ............. G06K 9/00369
                                                                  382/159

OTHER PUBLICATIONS

Antoni B. Chan, "Counting People With Low-Level Features and Bayesian Regression" IEEE, IEEE Transactions on Image Processing, vol. 21, No. 4, Apr. 2012, pp. 2160-2177 (18 pages).
Jorge Cândido, Maurício Marengoni, Combining information in a Bayesian network for face detection. Brazilian Journal of Probability and Statistics, 2009, vol. 23, No. 2, 179-195; pp. 179-195 (17 pages).
Jianguo Zhang, Shaogang Gong, "People detection in low-resolution video with non-stationary background" Image and Vision Computing Journal, 2009, pp. 437-443 (7 pages).
Luciano Spinello, Roland Siegwart, "Human Detection using Multimodal and Multidimensional Features", ASL—Swiss Federal Institute of Technology Zurich, Switzerland, May 2008 (6 pages).
International Search Report issued Jun. 21, 2013 in International Application No. PCT/IN2012/000733 (3 pages).

* cited by examiner

SYSTEM AND METHOD FOR ENHANCING HUMAN COUNTING BY FUSING RESULTS OF HUMAN DETECTION MODALITIES

CROSS-REFERENCE TO RELATED PATENT APPLICATIONS

This application is a National Stage Entry under 35 U.S.C. §371 of International Application No. PCT/IN2012/000733, filed Nov. 7, 2012, which claims priority from Indian Patent Application No. 3167/MUM/2011, filed Nov. 9, 2011. The entire contents of the above-referenced applications are expressly incorporated herein by reference for all purposes.

FIELD OF THE INVENTION

The present invention generally relates to the field of image processing and particularly to a method and the system for enhancing the accuracy of human count in an image in real time. The present invention is an improvement of the invention described and claimed in an earlier Indian Patent Application no. 1359/MUM/2011.

BACKGROUND OF THE INVENTION

Detection of human activities in an image or video is of crucial importance and it is critical to determine the human presence for applications where automatic human body detection is a key enabler such as security and surveillance, robotics, surveillance and Intelligent Transport System, autonomous vehicle and automatic driver assistance system etc. Similarly, in computer vision systems, segmentation of image for detection of objects in each segment and differentiating human from other objects is still a challenge.

Large numbers of visual pattern that appear in an image increase the complexity. Human detection involves the ability of hardware and software to detect the presence of human in an image. Detection of human in an image currently is performed by using various human detection techniques and algorithms. Though such techniques and algorithms are widely used however results provided by said techniques or algorithms often contain large number of false predictions.

Many solutions have been proposed to address the problems associated with reduction of the false predictions or errors associated with the human detection and tracking techniques. One of the frequently followed techniques for detection of human is to combine plurality of human detection techniques in order to detect human in real time. However, the success of combination is affected by an error associated with each detection technique. One such solution has been disclosed in U.S. Pat. No. 7,162,076 of Chengjun Liu that teaches a vector to represent an image to be analyzed, from the DFA vector as processed using a Bayesian fusion Classifier technique. Although, the method discloses face detection with relatively low probability of error and false detection rate but it remains silent on determining the accuracy of the solution when more than one technique or algorithm is involved.

Therefore, there is a need in the art of a solution which is capable of reducing the false predictions of the plurality of techniques available for human detection by determining the accuracy of all the techniques applied for detection of human in an image.

OBJECTS OF THE INVENTION

It is the primary object of the invention to suggest a system and method that enhances the accuracy of human count in a human detection modality.

It is another object of the invention to suggest a system and method that reduces the non-reliable factors associated with the human detection modality.

It is yet another object of the invention to suggest a system and method that selects the most accurate human detection modality for counting a human in frame of a captured image.

SUMMARY OF THE INVENTION

In one aspect the present invention discloses a method for enhancing accuracy of human counting in at least one frame of a captured image in real-time in a predefined viewing area, wherein the said method comprises processor implemented steps of, detecting human in one or more frames by using at least one human detection modality for obtaining a characteristic result of the said captured image and calculating an accuracy probability by switching between the obtained characteristic result of the human detection modalities and by using the pre calculated activity probability. The activity probability is adapted to determine a variance in detected human count in each frame. The said method further comprises of the processor implemented step of selectively integrating the obtained characteristic results for each frame from a combination of human detection modalities and the activity probability by using a selection technique for detecting the location of the human in the predefined viewing area. The combination of human detection modalities is based on a Bayesian fusion technique.

In another aspect the present invention also discloses a system for enhancing accuracy of human counting in at least one frame of a captured image in real-time in a predefined viewing area wherein the said system comprises of a detection unit embedded with at least one modality component. The detection unit is configured to detect human in cooperation with at least one human detection modality to obtain characteristic result associated with the said captured image. The system further comprises of a calculation module adapted to calculate an activity probability associated with each human detection modality. The activity probability determines a variance in detected human count in each frame. The system further comprises of a fusion processor adapted to selectively integrate the plurality of characteristic results obtained from each human detection modality for each frame.

DETAILED DESCRIPTION OF THE INVENTION

Some embodiments of this invention, illustrating its features, will now be discussed: The words "comprising", "having", "containing", and "including", and other forms thereof are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention relates to a method and a system for enhancing accuracy of human counting. Human counting is usually performed by using a plurality of human detection modalities. These human detection modalities, e.g. Histogram Oriented Gradient (HOG), Haar, and Background Subtraction (BG) detect and tracks human images to determine number thereof. Each human detection modality is associated with certain non-reliable factors, example, Fluctuation in video frames, improper detection of human, false positives, etc. The present invention calculates an accuracy of each human detection modality for reducing these non-reliable factors. The reduction in non reliable factors results in enhanced accuracy of human count further enabling selection of the most accurate human detection modality.

In accordance with various aspects and embodiments of the present invention, the methods described herein are intended for operation as software programs (set of programmed instructions) running on a computer processor.

Figure 1:
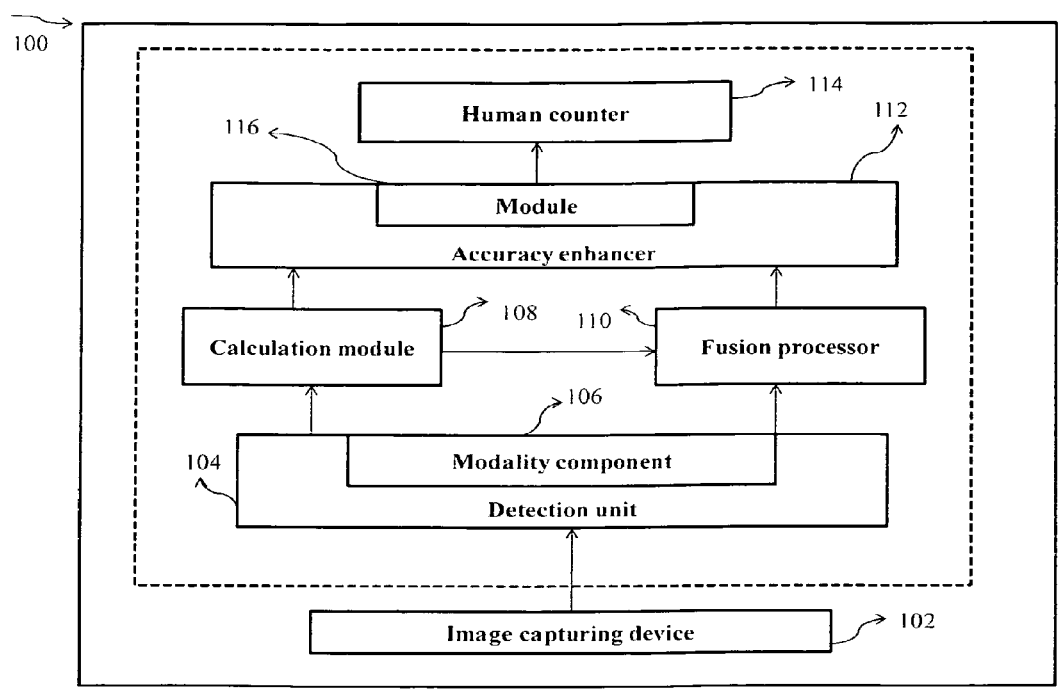
FIG. 1 illustrates the architecture of the system in accordance with an embodiment of the invention.

In accordance with an aspect, referring to FIG. 1, the system (100) comprises of an image capturing device (102) for capturing an image in plurality of frames. The system (100) further comprises of a detection unit (104) configured for detecting human. The detection unit (104) is further embedded with at least one modality component (106) to apply at least one human detection modality for detection of human in at least one frame. The human detection modality is applied to obtain characteristics result associated with the captured image. The characteristic results include pixel value of a grayscale image of human. The human detection modality includes and is not limited to Haar, Histogram Oriented Gradient (HOG), Background Subtraction (BGS) or a combination thereof.

In accordance with an embodiment of the invention, the system (100) further comprises of a tracking module (not shown in the figure) for tracking of human in one or more frames. The tracking module further processes the human image for tracking human by differentiating it with the non reliable factor present in the image.

The system (100) further comprises of a calculation module (108) adapted to calculate an activity probability associated with each human detection modality. The activity probability provides a value of fluctuation in each frame of captured image for determining a variance in detected human count in each frame. The calculation module (108) also calculates an accuracy probability for determining the accuracy of each human detection modality.

The system (100) further comprises of a fusion processor (110) communicating with the detection unit (104) and the calculation module (108) and is adapted for selectively integrating the characteristic results associated with the image captured by the image capturing device (102) and the activity probability associated with the each human detection modality.

In accordance with an embodiment, the system (100) further comprises of an accuracy enhancer (112) communicatively coupled with the fusion processor (110). The accuracy enhancer (112) functions with the fusion processor (110) for enhancing the accuracy of the human count in the image. The accuracy enhancer (112) further comprises of a module (116) which selectively integrates the characteristic result associated with each human detection modality and the activity probability associated with the each human detection modality by using a regression model. The selective integration is performed to select the most accurate human detection modality.

The system (100) further comprises of a human counter (114) communicating with the accuracy enhancer (112). The human counter (114) is adapted to count human in accordance with the selected human detection modality. The favorable human detection modality is the most accurate human detection modality selected by the accuracy enhancer (112) after the selective integration is performed.

Figure 2:
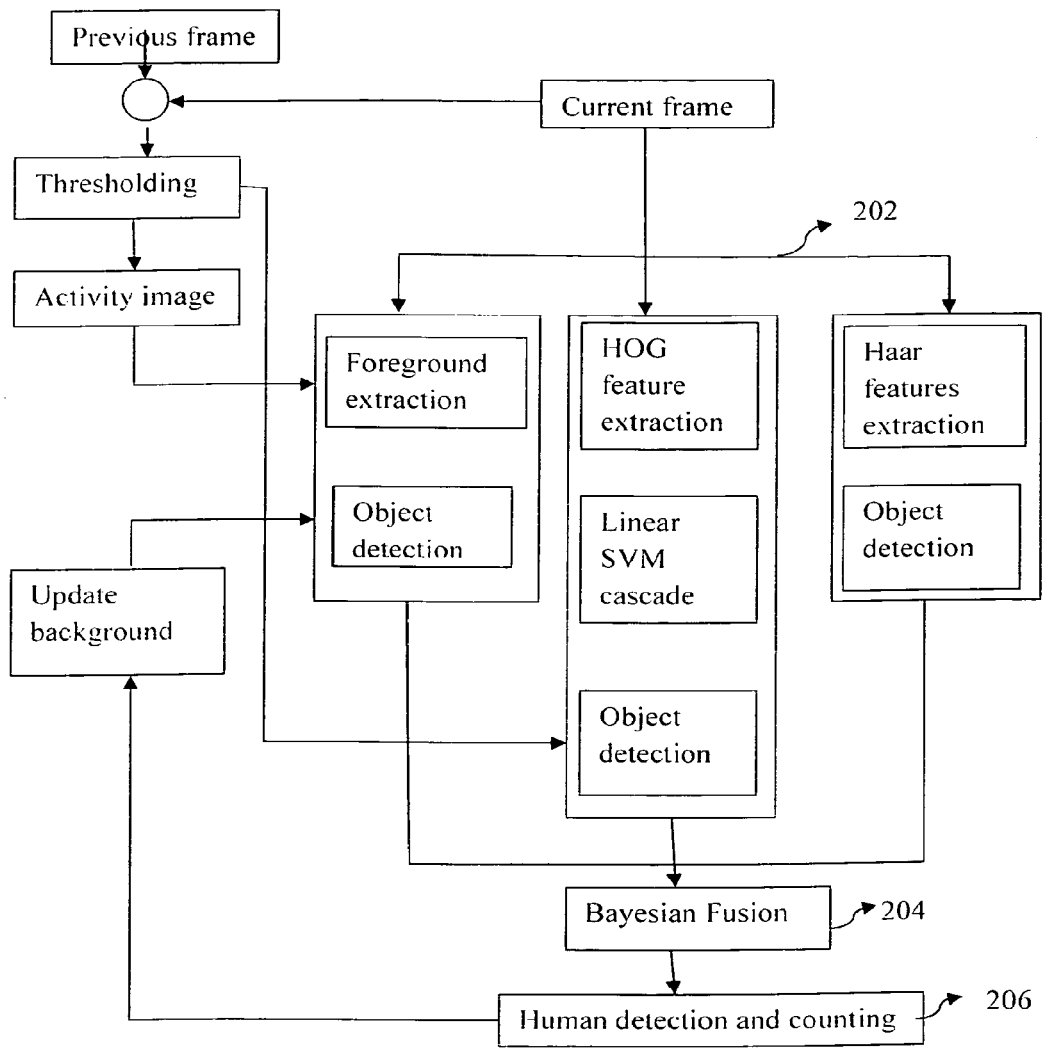
FIG. 2 illustrates the mechanism of human count in accordance with an alternate embodiment of the invention.

In accordance with an embodiment, referring to FIG. 2, the image capturing device (102) captures an image of human in a current frame and a previous frame. One or more features of the extracted image in the plurality of frame are compared to a threshold value. The threshold value is selected manually. The threshold value helps in determining whether the image is an activity image. The activity image is an image captured in an unstable frame. The activity is calculated by the calculation module (108) in terms of the activity probability.

The human is then detected by the detection unit (104) in one or more frames by using at least one human detection modality. Still referring to FIG. 2, as shown in step 202, the detection unit (104) applies foreground extraction for detecting human. The detection unit (104) further applies Histogram Oriented Gradient (HOG) for detecting human body. The cascading of linear SVM is done for fast object detection. Here object refers to human. The detection unit (104) further applies Haar feature extraction for detecting face of human. The background changes are detected by using Background Subtraction (BGS) (referring to Parent Application No 1359/MUM/2011).

Again referring to FIG. 1, the calculation module (108) calculates an activity probability. The calculation module (108) further calculates an accuracy probability of each human detection modality by switching between the characteristic results obtained from the human detection modalities and by using the value of pre calculated activity probability. The activity probability determines a variance in detected human count in each video frame.

Referring to FIG. 2, as shown in step 204, the fusion processor (110) generates a combination of the characteristic results obtained from individual human detection modalities by using a selection technique. The selective integration of the characteristic results of the above combination is performed to detect the location of human and to reduce non-reliable factors associated with each human detection modality.

In accordance with an embodiment, the selection technique used for performing the combination of individual human detection modalities is a Bayesian Fusion technique. The Bayesian Fusion improves the classification performance of the human detection modalities. The individual human detection modalities (Haar, Histogram Oriented Gradient (HOG), Background Subtraction (BGS) provides their own characteristic results. The classification system determines whether an object belongs to a Human class (H) by observing the activity probability associated with each human detection modality. The Bayesian classifier of the Bayesian fusion technique fuses them with any prior p(H) to arrive to a global consensus posterior probability, p(H/Z), where Z=☐$_i${$Z_i$}∀i. p(H) is the prior probability of class type H and Z={HOG, BGS, Haar}. The Histogram Oriented Gradient (HOG) classifier describes the posterior probability of object belonging to the human class H by: p (H/$Z_{HOG}$). Similarly, p (H/$Z_{BGS}$) and p (H/$Z_{Haar}$) are given by the other two human detection modalities. Assuming these information cues of same importance, same confidence level of detection should be given in the information fusion process. The information fusion is addressed using Bayesian modeling approach.

Figure 3:
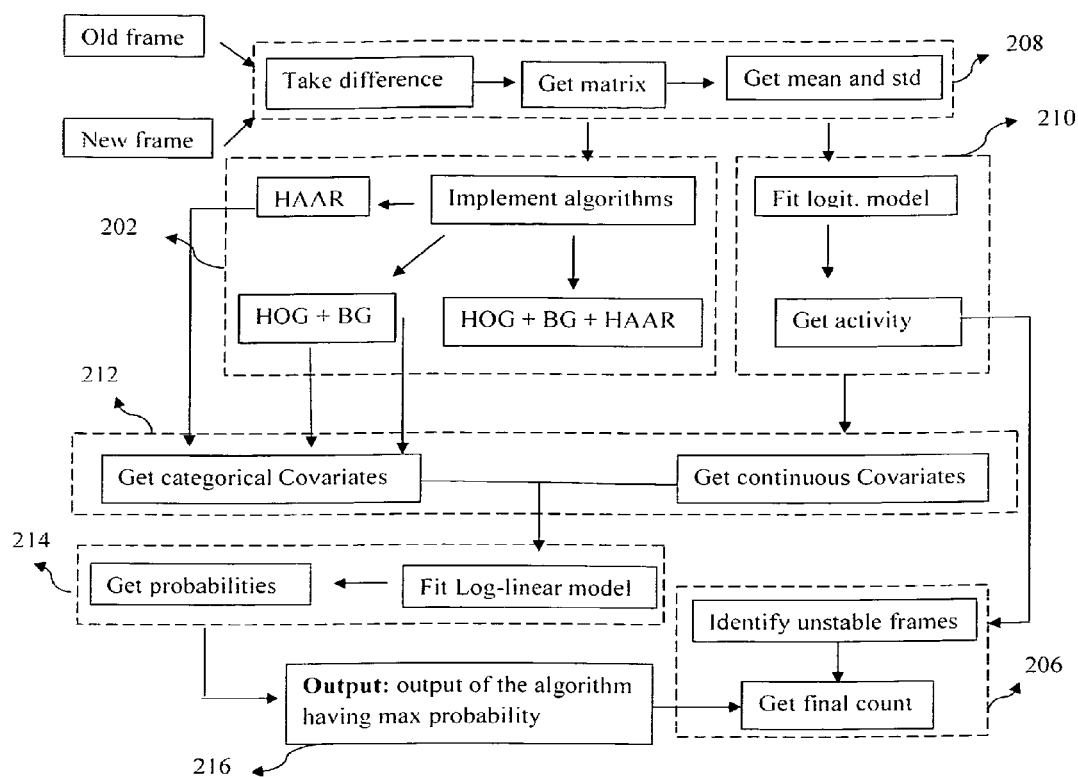
FIG. 3 illustrates the process flow of accuracy calculation in accordance with an alternate embodiment of the invention.

In accordance with an embodiment, referring to FIG. 3, the image capturing device (102) captures the image in the plurality of frames for example in an old frame and a new frame. As shown in step 208, after taking the difference in feature values of both the frames a matrix is prepared. The feature value is the pixel value of image. The matrix is used for calculating the standard deviation and mean of the pixel value. As shown in step 202, the detection unit (104) further applies a plurality of human detection modality in one or more combination. The combination includes and is not limited to a combination of Histogram Oriented Gradient (HOG), Background subtraction and Haar, or a combination Histogram Oriented Gradient (HOG) and Background Subtraction (BG).

Starting from the joint distribution and applying recursively the conjunction rule decomposition is obtained:

$$p(H \cap Z_{HoG} \cap Z_{Haar} \cap Z_{BGS}) = p(H)p(Z_{HoG}/H)p(Z_{Haar}/H)p(Z_{BGS}/H) \quad (1)$$

Equation (1) assumes that the observations from different human detection modalities are independent. For multisensory system, it is reasonable to argue that the likelihood from each information source p($Z_i$/H), i=1 . . . n are independent since the only parameter they have in common is the state. The conditional probability defining the information fusion can be written as (2).

$$p(H/Z_{HoG} \cap Z_{Haar} \cap Z_{BGS}) = \frac{p(H)p(Z_{HoG}/H)p(Z_{Haar}/H)p(Z_{BGS}/H)}{\sum_H p(H)p(Z_{HoG}/H)p(Z_{Haar}/H)p(Z_{BGS}/H)} \quad (2)$$

Again referring to FIG. 3, the characteristic results obtained from each human detection modality include pixel value of grayscale image. Through these characteristic results a set of matrices can be formed where the entries of matrix includes pixel values of the grayscale image. As shown in step 210, the matrices will be processed by the fusion processor (110) and the accuracy enhancer (112) for identifying those frames where significant activity took place. This will give a measure of activity for each frame. The significant activity arises if the pixel values change significantly from the previous frame. Then the matrix will have entries of differences in pixel values and will be processed.

Again referring to FIG. 3, as shown in step 212 and 214, the accuracy enhancer (112) enhances the accuracy by applying the regression model to the characteristic result obtained by one or more human detection modality and the activity probability associated with the each human detection modality. The first step is to choose a mean and a standard deviation of the pixel values as a source of information. This value of mean and standard deviation would be taken as input covariates for applying the regression model to the activity probability and the accuracy probability will be calculated by using this value of activity probability.

For the covariate vector CV=[mean, variance], let V=[1, mean, variance]; then the value of the logistic regression y has the following distribution:

$$y = 1 \text{ with probability } p = \frac{e^{\alpha'V}}{1+e^{\alpha'V}};$$
$$= 0 \text{ With probability } p = \frac{1}{1+e^{\alpha'V}},$$

where α is the vector parameter of the model to be estimated.

Let there is a sample of size k for which the output values are predetermined. This predetermination can be a manual determination. The $y_i$ is known for i=1, 2, 3, . . . , k. A likelihood function L(α) which is a function of α given by:

$$L(\alpha) = \prod_{i=1}^{k} \left(\frac{e^{\alpha'V}}{1+e^{\alpha'V}}\right)^{y_i} \left(\frac{1}{1+e^{\alpha'V}}\right)^{1-y_i}.$$

The likelihood function L(α) is maximized with respect to α to obtain an estimate $\tilde{\alpha}$ as the value of α maximizing L(α).

With the help of these parameters, the value of activity probabilities is calculated. These values will provide a measure of activity. By way of specific example, a probability value greater than 0.7 indicates the desired unstable frame. With the help of this activity probability, the calculation module (108) will calculate the accuracy probability for determining the accuracy of each human detection modality.

Again referring to FIG. 3, as shown in step 212, as an input for regression model, there is output of human detection modalities. By way of specific example, there is output of three human detection modalities at a frame level. Let for each frame we have outputs $X_1$=Haar, $X_2$=HOG+BG and $X_3$=HOG+BG+Haar. All of these $X_i$s, are categorical variable taking values in integers.

The other input is the calculated activity probability, P for each human detection modality.

As the covariates, a set of independent contrasts is picked based on the inputs and the activity probability is taken unchanged as a covariate.

In other words the covariates are:

$CV_1 = X_2 - X_1$;

$CV_2 = X_3 - X_1$;

$CV_3 = P$;

Let ℘ =the set of all probability distribution over these algorithms

ℵ =the set of all possible values of covariates.

A model is a function $f: \aleph \mapsto \wp$. The best element in the class of these functions is chosen. But it is evident that the best element in that class is the regression model for which the output is closest to a ground truth data with probability value 1 (manually determined ground truth will be available for a small sample).

Let us consider a special class of functions $f(CV)=g(\alpha'V)$. Here V is an elementary transformation on CV. The optimum value of the matrix $\alpha$ will be determined for which the regression model gives best performance from the observed data available or sample. It is generally considered that g is a convex smooth function (means a function having non-zero positive derivative up to a certain order) for example: vector of logic functions for individual rows of $\alpha'V$.

Let $CV_i$ takes $n_i$, values $k_{i,1}, k_{i,2}, k_{i,3}, \ldots k_{i,n_i}$, then for the $i^{th}$ covariate we introduce $n_i-1$ indicator variables $I_{i,1}, I_{i,2}, I_{i,3}, \ldots I_{i,n_i-1}$ as $I_{i,j}=\text{Ind}(CV_i=k_{i,j})$ for $i=1,2; j=1, 2, 3, \ldots n_i$. Then that transformed vector is defined as follows: $V=(1, I_{1,1}, I_{1,2}, I_{1,3}, \ldots I_{1,n_1-1}, I_{2,1}, I_{2,2}, I_{2,3}, \ldots I_{2,n_2-1}, CV_3)'$.

The ground truth data provides a sample of desired output vectors $Y=(y_1, y_2, y_3)$. One of the $y_i$ is 1 and the rest are zeros. From the frame level values a function of the parameters is constructed and maximized with respect to the parameters to get the regression model.

Let us assume g to be a vector of logic functions. Let V has m elements. It is considered that $\alpha=[\alpha_1, \alpha_2]$, where $\alpha_1$ and $\alpha_2$ are vectors of length m.

Then $g(\alpha'V)=g([\alpha_1, \alpha_2]'V)=[p_1(\alpha'V), p_2(\alpha'V), p_3(\alpha'V)]'$ where $p_i$s are defined as:

$$p_1(\alpha'V)=\exp(\alpha_1'V)/[1+\exp(\alpha_1'V)+\exp(\alpha_2'V)];$$

$$p_2(\alpha'V)=\exp(\alpha_2'V)/[1+\exp(\alpha_1'V)+\exp(\alpha_2'V)]; \text{ and}$$

$$p_3(\alpha'V)=(1-[p_1(\alpha'V)+p_2(\alpha'V)]).$$

Let there is a sample of size k. Then the likelihood function is $$L(\alpha) = \prod_1^k p_i(\alpha'V(j))^{y_1(j)} p_2(\alpha'V(j))^{y_2(j)} p_3(\alpha'V(j))^{y_3(j)}.$$

The likelihood function $L(\alpha)$ with respect to $\alpha$ is maximized by using Fisher's scoring method to obtain an estimate $\hat{\alpha}$ called the maximum likelihood estimate of $\alpha$.

Referring to FIG. 3, as shown in step 214, after deriving the parameters the accuracy probabilities are calculated by the calculation module (108) by using the pre calculated activity probability which is calculated by using the regression model. As shown in step 216, the human detection modality having the maximum probability is selected for reducing the non-reliable factors. When there is more than one human detection modality with the maximum probability then there is a random selection.

Referring to FIGS. 2 and 3, as shown in step 206, the human counter (114) then counts the human by using the human detection modality having the maximum probability in a window along with considering the stable frames.

BEST MODE/EXAMPLE FOR WORKING OF THE INVENTION

Figure 4:
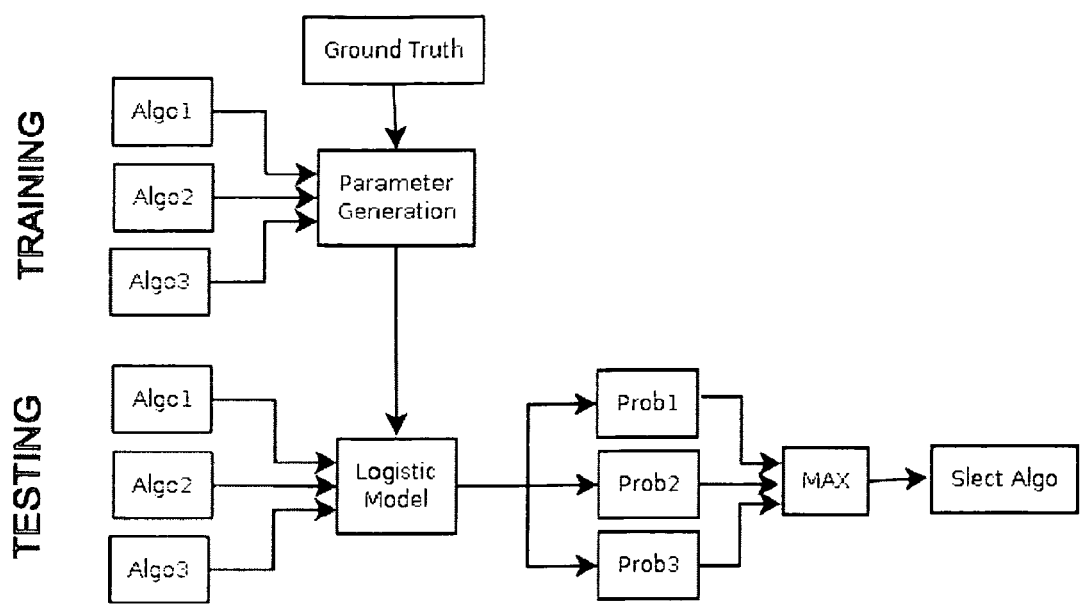
FIG. 4 illustrates an exemplary embodiment of the invention.

Referring to FIG. 4, for human detection and counting plurality of human detection modalities are used in groups or in an individual form. Let they are termed as algorithm. These Algorithms are used for the purpose of training and testing. The ground truth data includes the data for reference which is selected manually. The selection of human detection modalities is as follows:

Algo 1—Haar,
Algo 2—Histogram Oriented Gradient(HOG)+Background Subtraction(BG)
Algo 3—Haar+Histogram Oriented Gradient(HOG)+Background Subtraction(BG), such that Algo refers to algorithm.

With the help of predetermined ground truth data, the desired parameters are generated manually. For Algo 1, Algo 2 and Algo 3 the calculation module (108) calculates activity probabilities which are Prob 1, Prob 2 and Prob 3 respectively. By means of the fusion processor (110) and the accuracy enhancer (112) the selective integration of these algorithms is performed by applying a regression model. The calculated detection rate and false positives for Algo 1, Algo 2 and Algo 3 are tabulated as:

Table 1 and 2: Detection Rate and False Positives:

TABLE 1

|  | Haar | HOG | Haar + HOG + BGS | Model |
|---|---|---|---|---|
| Scenario 1 | 0.210 | 0.842 | 0.868 | 0.868 |
| Scenario 2 | 0.964 | 1.0 | 1.0 | 1.0 |
| Scenario 3 | 0.944 | 0.944 | 0.952 | 0.944 |
| Scenario 4 | 0.656 | 0.807 | 0.839 | 0.792 |
| Scenario 5 | 0.538 | 0.608 | 0.753 | 0.601 |
| Scenario 6 | 0.538 | 0.608 | 0.753 | 0.601 |
| Scenario 7 | 0.961 | 0.961 | 0.961 | 0.961 |
| Scenario 8 | 0.971 | 0.987 | 0.991 | 0.975 |
| Scenario 9 | 0.869 | 0.956 | 0.956 | 0.869 |

TABLE 2

|  | Haar | HOG | Haar + HOG + BGS | Model |
|---|---|---|---|---|
| Scenario 1 | 0 | 0.105 | 0.026 | 0.026 |
| Scenario 2 | 0.107 | 0.232 | 0.324 | 0.014 |
| Scenario 3 | 0.0079 | 0.0079 | 0.015 | 0.007 |
| Scenario 4 | 0.096 | 0.096 | 0.130 | 0.085 |
| Scenario 5 | 0.0018 | 0.006 | 0.009 | 0.0018 |
| Scenario 6 | 0.0018 | 0.006 | 0.009 | 0.0018 |
| Scenario 7 | 0 | 0 | 0.038 | 0 |
| Scenario 8 | 0.248 | 0.492 | 0.512 | 0.256 |
| Scenario 9 | 0.043 | 0.087 | 0.043 | 0.043 |

Figure 5:
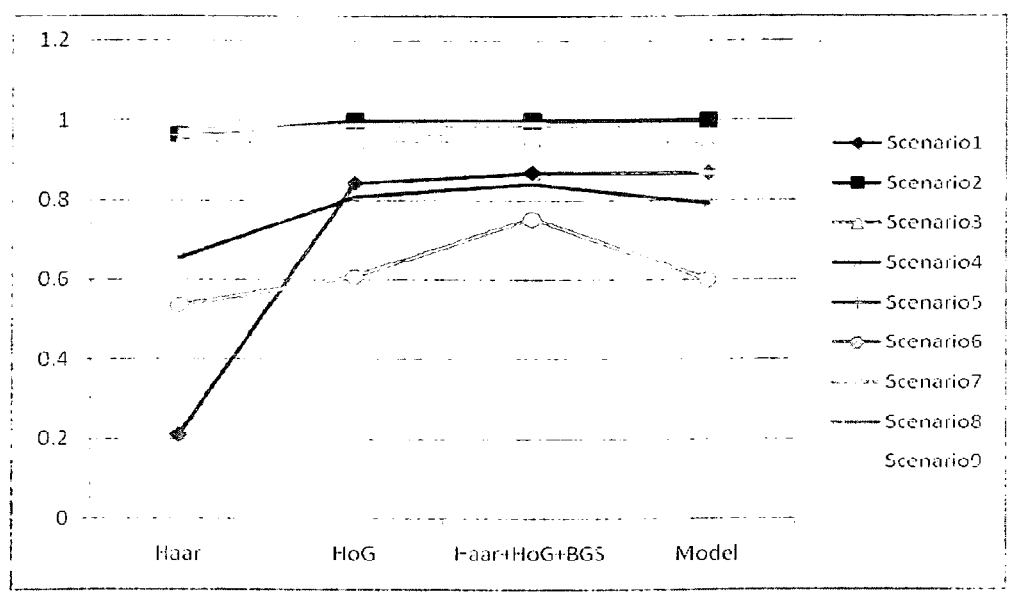
FIG. 5 illustrates the results of detection accuracy in accordance with an exemplary embodiment of the invention.
Figure 6:
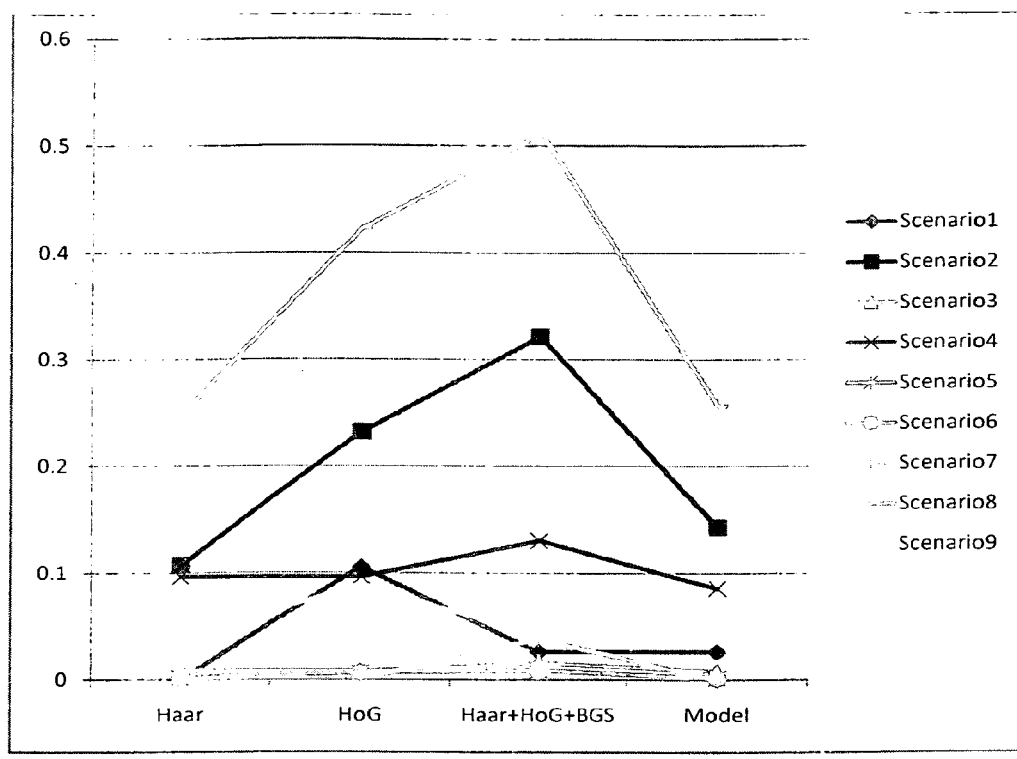
FIG. 6 illustrates the results for non-reliable factors in accordance with an alternate embodiment of the invention.

FIGS. 5 and 6 illustrates the graphical representation of the results obtained from table 1 and 2 for showing detection rate and false positives respectively.

In the above mentioned table, the algorithm with maximum accuracy probability is selected.

With the above approach, a reduction in non-reliable factors or false positives is achieved from 40% to below 20% while maintaining the detection accuracy.

The methodology and techniques described with respect to the various aspects and embodiments can be performed using a machine or other computing device within which a set of instructions, when executed, may cause the machine to perform any one or more of the methodologies discussed above. The machine may include a processor (e.g., a central processing unit (CPU), a graphics processing unit (GPU, or both), a main memory and a static memory, which communicate with each other via a bus. The disk drive unit may include a machine-readable medium on which is stored one or more sets of programmed instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

The preceding description has been presented with reference to various aspects, embodiments and drawings. Persons skilled in the art and technology to which this application pertains will appreciate that alterations and changes in the described structures and methods of operation can be practiced without meaningfully departing from the principle and scope.

We claim:

1. A computer implemented method for enhancing accuracy of real-time human counting in at least one frame of a captured image in a predefined viewing area, the method comprising steps of:
    detecting, by a processor, a human in one or more frames by using a plurality of human detection modalities, each of the plurality of human detection modalities obtaining a characteristic result of the said captured image;
    calculating, by the processor, an accuracy probability of each of the plurality of human detection modalities by evaluating each of the obtained characteristic results of the plurality of human detection modalities and using a pre calculated value of an activity probability of the plurality of human detection modalities, the activity probability adapted to determine a variance in detected human count in each frame;
    generating, by the processor, a combination of the obtained characteristic results of the plurality of human detection modalities by using a Bayesian fusion technique;
    selectively integrating, by the processor, the obtained characteristic results for each frame from the combination of the plurality of human detection modalities and the activity probability associated with the plurality of human detection modalities by using a regression model, wherein mean and standard deviation values of differences between pixel values of each frame and a previous frame are taken as input covariates for applying the regression model to the activity probability, wherein the integrating comprises quantifying the accuracy probability of each of the plurality of human detection modalities within each frame and selecting a human detection modality among the plurality of human detection modalities with maximum accuracy probability above the integrated fusion characteristic results; and
    counting humans in each frame using the selected human detection modality.

2. The method as claimed in claim 1, wherein the calculated activity probability of each of the plurality of human detection modalities provides a value close to a ground truth data, and wherein the ground truth data includes predetermined values for comparing the input covariates.

3. The method of claim 1, wherein the human detection further comprises of the processor implemented step of real time tracking of one or more human within the predefined viewing area of at least one image capturing device.

4. The method as claimed in claim 1, wherein the detecting of one or more human further comprises of the processor implemented steps of detecting human face of the human using Haar, detecting human body of the human using Histogram Oriented Gradient (HOG) and changes in background associated with the human body using Background Subtraction (BGS) or a combination thereof.

5. The method as claimed in claim 1, wherein the characteristic results include pixel values of a grayscale image of human.

6. The method as claimed in claim 1, wherein the Bayesian fusion technique used for selectively integrating the characteristic results and the activity probability is a selection technique.

7. The method as claimed in claim 4, wherein the combination of Haar, HOG and BGS is based on Bayesian Fusion technique.

8. A system for enhancing, accuracy of human counting in at least one frame of a captured image in real-time in a predefined viewing, area, the system comprising:
    a processor; and
    a memory coupled to the processor, wherein the processor is capable of executing a plurality of modules stored in the memory, and wherein the plurality of modules comprising:
    a detection unit embedded with at least one modality component, the detection unit configured to detect a human using a plurality of human detection modalities, each of the plurality of human detection modalities obtaining a characteristic result associated with the said captured image;
    a calculation module configured to calculate an accuracy probability associated with each of the plurality of human detection modalities using a pre calculated value of an activity probability of the plurality of human detection modalities, the activity probability adapted to determine a variance in detected human count in each frame;
    a fusion processor adapted to:
    generate a combination of the obtained characteristic results of the plurality of human detection modalities using a Bayesian fusion technique; and
    selectively integrate the characteristic results obtained from each of the plurality of human detection modalities for each frame and the activity probability associated with the plurality of human detection modalities by using a regression model, wherein mean and standard deviation values of differences between pixel values of each frame and a previous frame are taken as input covariates for applying the regression model to the activity probability;
    a module contained in an accuracy enhancer adapted to quantify the accuracy probability of each of the plurality of human detection modalities within each frame and select a human detection modality among the plurality of human detection modalities with maximum accuracy probability above the integrated fusion characteristic results; and
    a human counter adapted to count humans in each frame using the selected human detection modality.

9. The system as claimed in claim 8, wherein an input covariate of the regression model includes the characteristic results associated with the captured image and the calculated activity probability.

10. The system as claimed in claim 8, wherein the system further comprises a tracking module for tracking human in one or more frame.

11. The system as claimed in claim 8, wherein the human detection modality includes Haar, Histogram Oriented Gradient (HOG), Background Subtraction (BGS) or a combination thereof.

* * * * *